United States Patent
Onishi

[11] Patent Number: 5,810,382
[45] Date of Patent: Sep. 22, 1998

[54] GRIP BAR FOR BABY CARRIAGE

[75] Inventor: Ichiro Onishi, Osaka, Japan

[73] Assignee: Aprica Kassai Kabushikikaisha, Osaka, Japan

[21] Appl. No.: 663,141

[22] PCT Filed: Oct. 19, 1995

[86] PCT No.: PCT/JP95/02147

§ 371 Date: Jun. 13, 1996

§ 102(e) Date: Jun. 13, 1996

[87] PCT Pub. No.: WO96/12637

PCT Pub. Date: May 2, 1996

[30] Foreign Application Priority Data

Oct. 20, 1994 [JP] Japan .................... 6-255260

[51] Int. Cl.$^6$ .................. B62B 1/00; B62B 3/00
[52] U.S. Cl. .................. 280/658; 280/648; 403/62; 403/93
[58] Field of Search .................. 280/642, 644, 280/648, 650, 658; 403/62, 92, 93, 96, 100, 102, 325

[56] References Cited

U.S. PATENT DOCUMENTS

| 4,216,974 | 8/1980 | Kassai | 280/42 |
| 4,506,907 | 3/1985 | Miyagi | 280/642 |
| 4,614,454 | 9/1986 | Kassai | 403/62 |
| 4,619,542 | 10/1986 | Kassai | 403/62 |
| 4,846,494 | 7/1989 | Kassai | 280/642 |

FOREIGN PATENT DOCUMENTS

| 1297372 | 11/1989 | Japan . |
| 1171772 U | 12/1989 | Japan . |
| 139145 | 8/1990 | Taiwan . |
| 2156747 | 10/1985 | United Kingdom | 280/644 |

*Primary Examiner*—Robert J. Orerleitner
*Assistant Examiner*—Pamela J. Lipka
*Attorney, Agent, or Firm*—W. F. Fasse; W. G. Fasse

[57] ABSTRACT

In a grip bar for a collapsible baby carriage, first and second portions 4 and 5 are coupled with each other by a rigid link member 28 within a joint 6, so that the first and second portions 4 and 5 symmetrically operate with respect to the joint 6. Thus, angles formed by the respective first and second portions 4 and 5 relative to the joint 6 can be kept identical to each other, whereby locking members 23 and 24 for both of the first and second portions 4 and 5 can be reliably and concurrently engaged in open state locking concave portions 19 and 20 or closed state locking concave portions 21 and 22. In this manner, it is possible to reliably and easily attain a locking state of both of the first and second portions 4 and 5 in either a linear open state or a folded state.

6 Claims, 4 Drawing Sheets

FIG. 4

GRIP BAR FOR BABY CARRIAGE

FIELD OF THE INVENTION

The present invention relates to a grip bar for coupling a pair of push rods of a collapsible baby carriage with each other. The grip bar has a central portion being rendered foldable, which enters a linear state in an open state of the baby carriage and enters a folded state in a closed state of the baby carriage, and more particularly, it relates to a grip bar for a baby carriage comprising a mechanism for locking the linear state and the folded state.

BACKGROUND INFORMATION

A typical example of a collapsible baby carriage, there is an article of a form comprises a pair of push rods so that the space between these push rods that are kept relatively wide apart in an open state of the baby carriage while these push rods are moved toward or approaching each other in a closed state of the baby carriage. Between such a pair of push rods, a grip bar is generally coupled. In the collapsible baby carriage of the aforementioned form, a central portion of this grip bar must be rendered foldable, for example, in order to allow the spacing between the pair of push rods to be charged while folding the baby carriage. The grip bar enters a linear state in an open state of the baby carriage, while the same enters a folded state in a closed state of the baby carriage.

In the collapsible baby carriage of the aforementioned form, an operation of locking both the linear state and the folded state of the grip bar is performed to make it possible to more strongly maintain the open state and the closed state. Such a locking mechanism is described in Japanese Utility Model Laying-Open No. 1-171772, for example.

In this prior art, a grip bar comprises a first portion forming one end portion, a second portion forming another end portion, and a joint which couples the first and second portions respectively while rotatably supporting the first and second portions about first and second rotary shafts which are parallel to each other respectively. In order to provide such a grip bar with a locking function, open state locking concave portions and closed state locking concave portions are formed on respective single side surfaces of the first and second portions extending in directions intersecting with axial directions of the first and second rotary shafts respectively. Further, locking members which are movable in the axial directions of the first and second rotary shafts are provided. These locking members are engaged in the open state locking concave portions respectively by movements thereof when the grip bar is in the linear state, and engaged in the closed state locking concave portions respectively by movements thereof when the grip bar is in the folded state. The locking members are urged by springs in directions to be engaged in the open state locking concave portions and the closed state locking concave portions. Further, an unlocking member is provided in order to supply an operating force for disengaging the locking members from the open state locking concave portions and the closed state locking concave portions against the elasticity or urging force of these springs.

According to such prior art, it is possible to fix the linear state and the folded state of the grip bar by engaging the locking members in the open state locking concave portions in the open state of the baby carriage and in the closed state locking concave portions in the closed state of the baby carriage, whereby the respective ones of the open state and the closed state of the baby carriage can be more strongly maintained.

While the unlocking member must be operated when the locking is to be released, the locking members can be automatically engaged in either of the open state locking concave portions and the open state locking concave portions by actions of the springs at the time of actuating a locked state.

In the aforementioned conventional grip bar, however, it can occur that the locking members may be first engaged in the open state locking concave portion of the first portion while not being engaged in the open state locking concave portion of the second portion when the same are intended to be engaged in both open state locking concave portions, for example, although the same are urged by the springs in the directions necessary to be engaged in the open state locking concave portions and the closed state locking concave portions. In this case, the user of the baby carriage must search for an angle at which the locking members can be engaged in the open state locking concave portion of the second portion while varying the angle formed by the second portion with respect to the joint. Similarly in the opposite situation the locking members may be first engaged only in the open state locking concave portion and not that of the first portion of a second portion also pertain in the case in which. Similar matters the locking members are to be engaged in the closed state locking concave portions.

When the locking members are engaged in the open state locking concave portion or the closed state locking concave portion only in either one of the aforementioned first and second portions, an operation for attaining engagement in both portions is troublesome. Moreover, the baby carriage may be carelessly used in an incomplete locking state, and this is not only undesirable in the point of safety but may cause breakage of the baby carriage.

Accordingly, an object of the present invention is to try to cause no incomplete locking state in a grip bar for a baby carriage comprising the aforementioned locking mechanism.

SUMMARY OF THE INVENTION

The present invention is directed to a grip bar for a baby carriage coupling a pair of push rods of a collapsible baby carriage with each other and having a central portion being rendered foldable, which enters a linear state in an open state of the baby carriage and enters a folded state in a closed state of the baby carriage. The present grip bar comprises a first portion forming one end portion, a second portion forming another end portion, a joint coupling the first and second portions respectively while rotatably supporting the first and second portions about first and second rotary shafts which are parallel to each other respectively, open state locking concave portions and closed state locking concave portions which are formed on respective single side surfaces of the first and second portions extending in directions intersecting with the axial directions of the first and second rotary shafts respectively, locking members which are movable in the axial directions of the first and second rotary shafts to be engaged in the open state locking concave portions respectively by movements thereof when the grip bar is in a linear state while being engaged in the closed state locking concave portions respectively by movements thereof when the grip bar is in a folded state, springs urging the locking members in directions for engaging the same in the open state locking concave portions and the closed state locking concave portions, and an unlocking member for supplying an operating force for disengaging the locking members from the open state locking concave portions and the closed state locking concave portions against the elasticity or urging force of the springs.

In order to solve the aforementioned technical problem of the prior art, the grip bar according to the present invention is characterized in that it further comprises a rigid link member having one end that is rotatably mounted on a first position of the first portion around the first rotary shaft and another end that is rotatably mounted on a second position of the second portion around the second rotary shaft, which is in a positional relation opposite to the positional relation of the first position with respect to the first rotary shaft, in order to keep angles formed by the respective ones of the first and second portions with respect to the joint identical in magnitude to each other.

According to the present invention, the rigid link member transmits both operations in a pushing direction and a pulling direction between the first and second portions, whereby the angles formed by the respective ones of the first and second portions with respect to the joint can be kept identical in magnitude to each other.

Therefore, the respective ones of the first and second portions are operated symmetrically to each other with respect to the joint according to the present invention, whereby it is possible to avoid a situation in which the locking members are engaged in the open state locking concave portion or the closed state locking concave portion only in either one of the first and second portions. Namely, according to the invention when a respective one of the locking members is engaged in the open state locking concave portion or the closed state locking concave portion on either one of the first and second portions, then the other one of the locking members is also necessarily engaged in the other open state locking concave portion or closed state locking concave portion.

Consequently, a complete locking state can be quickly attained in the grip bar both in the open state and the closed state of the baby carriage, without requiring a troublesome operation. Consequently, the grip bar encounters neither problem of safety nor problem of damage which may be caused when the baby carriage is used in an incomplete locking state.

DETAILED DESCRIPTION OF THE BEST MODE FOR CARRYING OUT THE INVENTION

Figure 3:
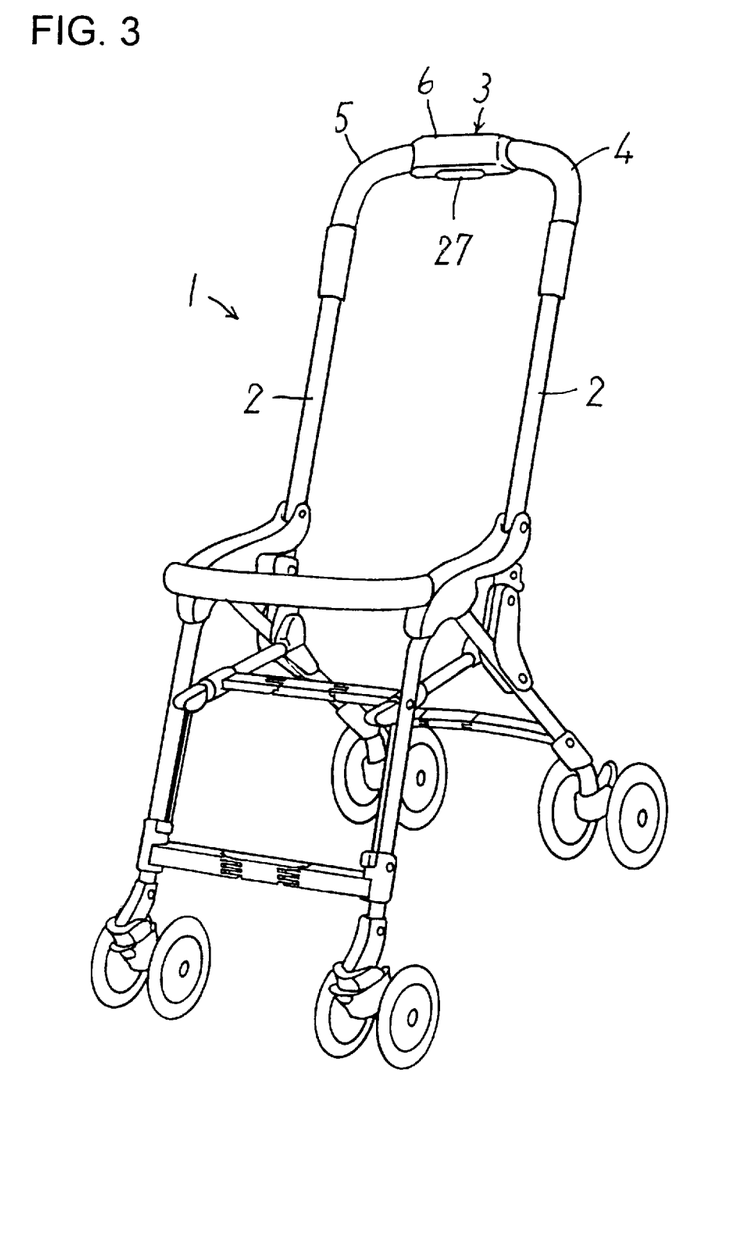
FIG. 3 is a perspective view showing the open state of the baby carriage 1 comprising the grip bar 3 shown in FIG. 1 and FIG. 2.
Figure 4:
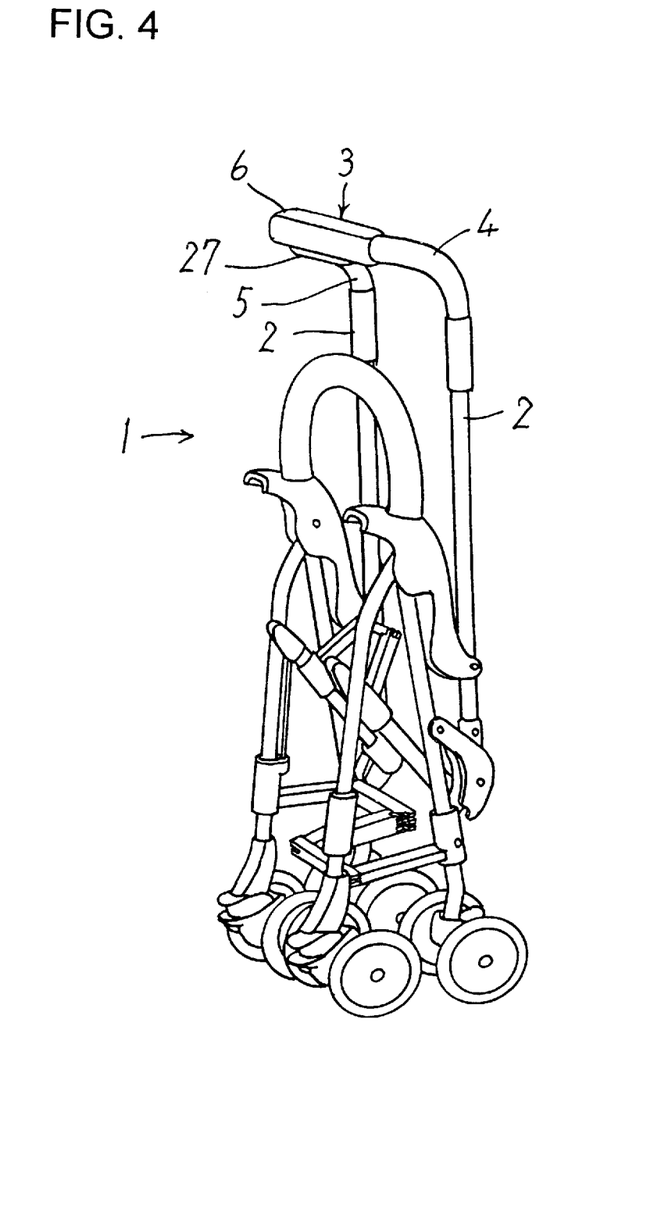
FIG. 4 is a perspective view showing the closed state of the baby carriage 1 shown in FIG. 3.

FIG. 3 is a perspective view showing a collapsible baby carriage 1 to which an embodiment of the present invention is applied, in an open state thereof. FIG. 4 is a perspective view showing a closed state of the baby carriage shown in FIG. 3. In FIG. 3 and FIG. 4, a seat which is to be mounted on the baby carriage 1 is omitted from the illustration.

The baby carriage 1 comprises a pair of push rods 2, and a grip bar 3 that is coupled between these push rods 2. In the open state of the baby carriage 1, the pair of push rods 2 are kept at a relatively wide spacing as shown in FIG. 3, while the spacing between the pair of push rods 2 is made narrower in the closed state of the baby carriage, as shown in FIG. 4. In order to allow such operations, a central portion of the grip bar 3 is rendered foldable. The grip bar 3 has two end portions extending on the same axial lines with the respective push rods 2, and these end portions are held rotatable with respect to the respective push rods 2, as understood when FIG. 3 is compared with FIG. 4.

The grip bar 3 comprises a first portion 4 forming one end portion, a second portion 5 forming another end portion, and a joint 6 coupling the first and second portions 4 and 5 respectively.

Figure 1A:
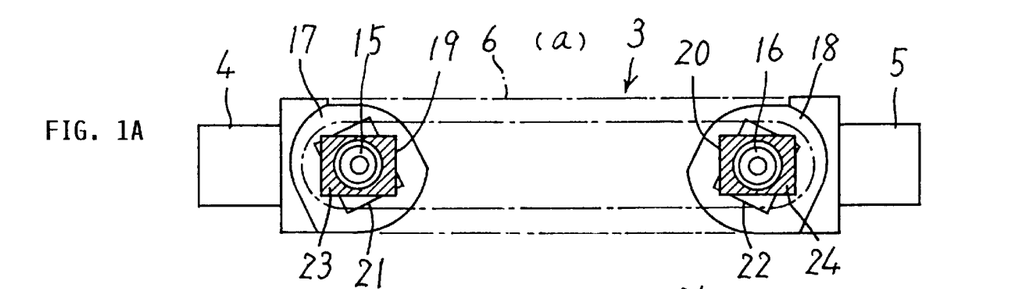
FIG. 1A is a plan view of a central portion of a grip bar 3 in an open state of a baby carriage 1 as shown in FIG. 3, omitting a part thereof.
Figure 1B:
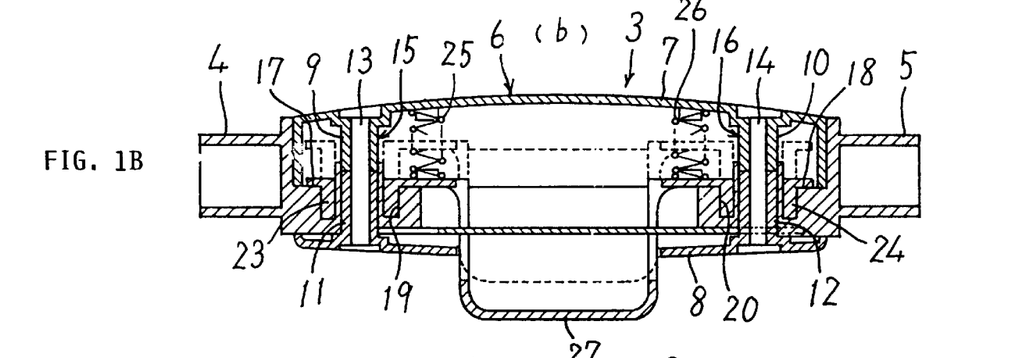
FIG. 1B is a sectional front elevational view of the grip bar of FIG. 1A.
Figure 1C:
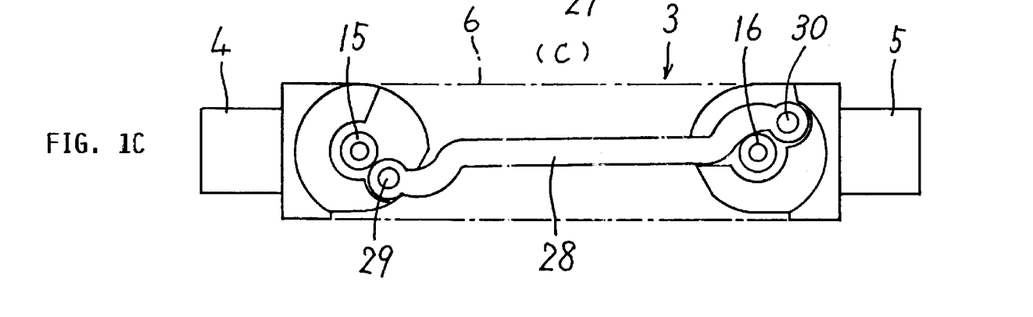
FIG. 1C is a bottom plan view of the grip bar of FIG. 1A, omitting a part thereof.
Figure 2A:
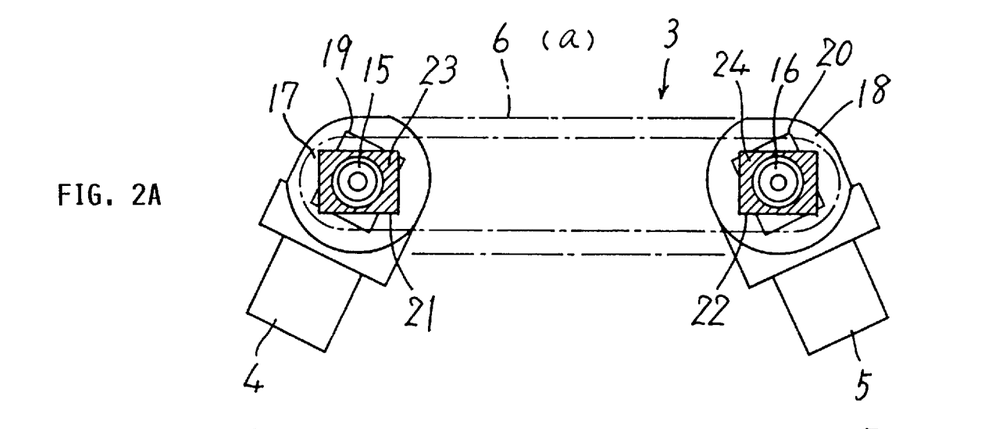
FIG. 2A is a plan view of the central portion of the grip bar 3 in a closed state of the baby carriage 1 as shown in FIG. 4, omitting a part thereof.
Figure 2B:
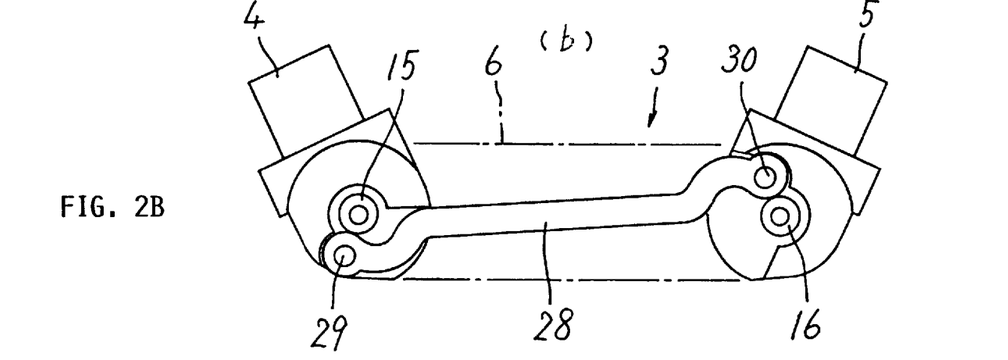
FIG. 2B is a bottom plan view of the grip bar of FIG. 2A omitting a part thereof.

FIG. 1 and FIG. 2 show the central portion of the grip bar 3. The state shown in FIG. 1 corresponds to the open state of the baby carriage 1 shown in FIG. 3, wherein the grip bar 3 is in a linear condition. On the other hand, the state shown in FIG. 2 corresponds to the closed state of the baby carriage 1 shown in FIG. 4, wherein the grip bar 3 is in a folded condition. Referring generally to FIG. 1, FIG. 1A is a plan view, FIG. 1B is a sectional/front elevational view, and FIG. 1C is a bottom plan view. Referring generally to FIG. 2, FIG. 2A is a plan view, and FIG. 2B is a bottom plan view. In FIG. 1A and 1C and FIG. 2A and 2B, illustration of some elements included in the grip bar 3 is omitted. In FIG. 1 and FIG. 2, further, only end pieces positioned on end portions on the side of the joint 6 are illustrated as the first and second portions 4 and 5.

Mainly with reference to FIG. 1B, the joint 6 comprises two housing half portions 7 and 8, and these housing half portions 7 and 8 are combined with each other thereby forming a space housing various elements in its interior. First and second bosses 9 and 10 are formed on the housing half portion 7, while first and second bosses 11 and 12 are formed on the housing half portion 8. The first bosses 9 and 11 and the second bosses 10 and 12 are aligned with each other respectively, a first rivet 13 is arranged to pass through the first bosses 9 and 11, and a second rivet 14 is arranged to pass through the second bosses 10 and 12. These rivets 13 and 14 serve functions of fixing the two housing half portions 7 and 8 to each other. Thus, a first rotary shaft 15 is provided by the first bosses 9 and 11 and the first rivet 13, while a second rotary shaft 16 is provided by the second bosses 10 and 12 and the second rivet 14. The first and second rotary shafts 15 and 16 are parallel to each other, whereby the first and second portions 4 and 5 are rotatably supported respectively.

Open state locking concave portions 19 and 20 and closed state locking concave portions 21 and 22 (see FIG. 1A and FIG. 2A) are formed on respective single side surfaces 17 and 18 of the first and second portions 4 and 5 extending in directions intersecting with the axial directions of the first and second rotary shafts 15 and 16 respectively. In this embodiment, the open state locking concave portion 19 and the closed state locking concave portion 21 are formed together as a concavity having an overall polygonal shape, while sharing parts thereof. Similarly, the open state locking concave portion 20 and the closed state locking concave portion 22 are also formed together as a concavity having an overall polygonal shape while sharing parts thereof.

Locking members 23 and 24 are arranged around the respective ones of the first and second rotary shafts 15 and 16. These locking members 23 and 24 are movable in the axial directions of the first and second rotary shafts 15 and 16, and are engaged in the open state locking concave portions 19 and 20 respectively by movements of the locking members when the grip bar 3 is in the linear state as shown in FIG. 1, and are engaged in the closed state locking concave portions 21 and 22 respectively by movements of the locking members when the grip bar 3 is in the folded state as shown in FIG. 2.

In order to engage the locking members 23 and 24 in the open state locking concave portions 19 and 20 and the closed state locking concave portions 21 and 22 as hereinabove described, springs 25 and 26 for urging the locking members 23 and 24 in directions of this engagement are arranged between the respective locking members 23 and 24 and the housing half portion 7. While the springs 25 and 26 are provided as compression springs in this embodiment, the same may alternatively be extension springs, by changing the arrangement states of the springs.

In order to supply an operating force for disengaging the locking members 23 and 24 from the open state locking concave portions 19 and 20 and the closed state locking concave portions 21 and 22 against the elasticity or urging force of the aforementioned springs 25 and 26, an unlocking member 27 is provided to project from the housing half portion 8. While the aforementioned locking members 23 and 24 and the unlocking member 27 have been formed by an integral part in this embodiment, these may be formed by separate parts, to integrally operate in an assembled state.

Mainly with reference to FIG. 1C and FIG. 2B, the first portion 4 and the second portion 5 are coupled with each other by one rigid link member 28. In more detail, an end of the rigid link member 28 is rotatably mounted on the first portion 4 on a first position of the first portion 4 around the first rotary shaft 15 through a pin 29. On the other hand, the other end of the rigid link member 28 is rotatably mounted on the second portion 5 on a second position of the second portion 5 around the second rotary shaft 16 through a pin 30. The position of the pin 29 with respect to the first rotary shaft 15 and the position of the pin 30 with respect to the second rotary shaft 16 are selected to be in an opposite relation to each other.

The mutual positional relation is selected to be the following relation, for example: Assuming that an angle of a straight line connecting the center of the pin 29 with the axis of the first rotary shaft 15 with respect to a straight line connecting the axis of the first rotary shaft 15 with the axis of the second rotary shaft 16 is positive θ, then an angle of a straight line connecting the center of the pin 30 with the axis of the second rotary shaft 16 with respect to a straight line connecting the axis of the first rotary shaft 15 with the axis of the second rotary shaft 16 and extending there beyond is negative θ. Stated differently, if the line connecting the axis of the first shaft 15 and the axis of the second shaft 16 is called the base line, then the angle from the base line to pin 29 is θ in a clockwise direction and the angle from the base line to pin 30 is (180°−θ) in a clockwise direction.

As hereinabove described, the rigid link member 28 can transmit bidirectional operations of the pushing direction and the pulling direction between the first and second portions 4 and 5 by coupling the first and second portions 4 and 5 with each other by the rigid link member 28, whereby the angles formed by the respective ones of the first and second portions 4 and 5 with respect to the joint 6 can be kept identical to each other at least in magnitude of the angle. Namely, the first and second portions 4 and 5 are forced by the rigid link member 28 to symmetrically operate with respect to the joint 6.

An operation method related to the grip bar 3 in the illustrated baby carriage 1 and an operation according to the same are now described.

As hereinabove described, the grip bar 3 is in the state shown in FIG. 1 when the baby carriage 1 is in the open state shown in FIG. 3. Namely, the locking members 23 and 24 are engaged in the open state locking concave portions 19 and 20 respectively, whereby both of the first and second portions 4 and 5 are locked in states in which there are unrotatable with respect to the locking members 23 and 24 as well as the joint 6 about the first and second rotary shafts 15 and 16. Therefore, the grip bar 3 is maintained in its linear state.

In order to release the locking in the aforementioned open state of the baby carriage 1, the unlocking member 27 is upwardly pressed. This state is shown by broken lines in FIG. 1B. Due to such pressing, the locking members 23 and 24 are upwardly displaced against the elasticity of the springs 25 and 26. Thus, the locking members 23 and 24 enter states disengaged from the open state locking concave portions 19 and 20. Therefore, both of the first and second portions 4 and 5 enter states in which there are rotatable about the first and second rotary shafts 15 and 16. While maintaining this state, the baby carriage 1 is converted from the open state shown in FIG. 3 to the closed state shown in FIG. 4.

The aforementioned pressing operation on the unlocking member 27 does not need to be maintained while the baby carriage 1 is brought into the closed state from the open state. Once the baby carriage 1 starts conversion from the open state to the closed state, the locking members 23 and 24 are maintained in states placed on the side surfaces 17 and 18 of the first and second portions 4 and 5, even if the pressing operation on the unlocking member 27 is released. At the termination of the conversion to the closed state, the locking members 23 and 24 are automatically engaged in the closed state locking concave portions 19 and 20 by actions of the springs 25 and 26. Thus, the first and second portions 4 and 5 become unrotatable with respect to the locking members 23 and 24 as well as the joint 6, whereby the folded state of the grip bar 3 is locked.

Also in case of bringing this baby carriage 1 from the closed state into the open state again, a substantially similar operation is executed, so that the locking members 23 and 24 are finally engaged in the open state locking concave portions 19 and 20, and the linear state of the grip bar 3 is locked.

In each of the aforementioned conversion from the open state to the closed state and the conversion from the closed state to the open state, the operations of the first and second portions 4 and 5 are interlocked by the rigid link member 28, so that the angles formed by the respective first and second portions 4 and 5 with respect to the joint 6 are kept identical to each other. When one locking member 23 is engaged with one open state locking concave portion 19 or one closed state locking concave portion 21, therefore, the other locking member 24 is necessarily engaged with the other open state locking concave portion 20 or the other closed state locking concave portion 22, whereby a complete locking state can be reliably attained with no requirement for a troublesome operation.

While the present invention has been described in relation to the illustrated embodiment, additional modifications are possible within the range of the present invention.

For example, respective shapes of the locking members, and the open state locking concave portions and the closed state locking concave portions can be modified in various ways.

Further, the baby carriage to which the present invention is applied is not restricted to that shown in FIG. 3 and FIG.

4, but may be any baby carriage having a grip bar coupling a pair of push rods with each other and having a central portion which is rendered foldable. The structure of the grip bar according to the present invention is advantageously applicable to a collapsible baby carriage.

I claim:

1. A grip bar for coupling a pair of push rods of a collapsible baby carriage with each others, having a central portion being rendered foldable, and being adapted to enter a linear state in an open state of the baby carriage and to enter a folded state in a closed state of the baby carriage, said grip bar comprising:

a first portion forming one end portion;

a second portion forming another end portion;

a joint coupling said first and second portions respectively while rotatably supporting said first and second portions about first and second rotary shafts being parallel to each other respectively;

open state locking concave portions and closed state locking concave portions being formed on respective single side surfaces of said first and second portions extending in directions intersecting with the axial directions of said first and second rotary shafts respectively;

locking members being movable in the axial directions of said first and second rotary shafts so as to be engaged in said open state locking concave portions respectively by movements of said locking members when said grip bar is in said linear state, and so as to be engaged in said closed state locking concave portions respectively by movements of said locking members when said grip bar is in said folded state;

springs urging said locking members in directions for engaging said locking members selectively in said open state locking concave portions and said closed state locking concave portions;

an unlocking member for supplying an operating force for disengaging said locking members from said open state locking concave portions and said closed state locking concave portions against said urging of said springs; and a rigid link member having one end rotatably mounted on a first position of said first portion around said first rotary shaft and another end rotatably mounted on a second position of said second portion around said second rotary shaft, wherein said second position around said second rotary shaft is in a positional relation opposite to the positional relation of said first position with respect to said first rotary shaft, for maintaining angles being formed by said first and second portions with respect to said joint identical in magnitude to each other;

wherein an angle of a straight line connecting said second position with the axis of said second rotary shaft with respect to a straight line connecting the axis of said first rotary shaft with the axis of said second rotary shaft is negative $\theta$ and an angle of a straight line connecting said first position with the axis of said first rotary shaft with respect to the straight line connecting the axis of said first rotary shaft with the axis of said second rotary shaft is positive $\theta$.

2. The grip bar in accordance with claim 1, wherein said open state locking concave portions and said closed state locking concave portions are formed together as concave portions having polygonal shapes overall and sharing parts thereof with said open state locking concave portions and said closed state locking concave portions.

3. In a collapsible baby carriage having a carriage frame, two push rods extending from the carriage frame, and a grip bar interconnecting the two push rods, wherein the grip bar includes first and second rod portions respectively connected to the two push rods and a joint centrally arranged between and foldably interconnecting the first and second rod portions so that the first and second rod portions are adapted to be positioned selectively in a linear unfolded state and in a non-linear folded state, the improvement wherein said joint comprises:

parallel first and second shafts on which respective joint ends of said first and second rod portions are respectively rotatably mounted, wherein a respective first locking concavity and a respective second locking concavity are formed on each said joint end, first and second locking members that are arranged axially movably on said first and second shafts respectively, and that are both respectively adapted to be selectively engaged in said first locking concavities so as to lock said first and second rod portions against rotation when said first and second rod portions are positioned in said linear unfolded state and to be selectively engaged in said second locking concavities so as to lock said first and second rod portions against rotation when said first and second rod portions are positioned in said non-linear folded state, at least one spring urging said first and second locking members toward said first and second locking concavities, a pushbutton connected to said first and second locking members and adapted to move said first and second locking members away from said first and second locking concavities against said urging of said at least one spring, and a rigid link member, having a first end pivotally connected to a first pivot point displaced from said first shaft on said joint end of said first rod portion, and having a second end pivotally connected to a second pivot point displaced from said second shaft on said joint end of said second rod portion, wherein a first angle measured clockwise about said first shaft from a base line extending between said first and second shafts to said first pivot point is $\theta°$ and a second angle measured clockwise about said second shaft from said base line to said second pivot point is $(180°-\theta°)$, such that pivotal motions of said first and second rod portions respectively about said first and second shafts are symmetrically interlinked so that respective angular positions of said first and second rod portions relative to said joint are always symmetrical.

4. The improvement in accordance with claim 3, wherein said first and second locking concavities in each said joint end of said first and second rod portions respectively comprise concentric, overlapping, rotationally offset, polygon-shaped concave depressions.

5. The improvement in accordance with claim 4, wherein each said first locking concavity and each said second locking concavity has a respective rectangular peripheral shape.

6. The improvement in accordance with claim 3, including only one said rigid link member having ends respectively connected to said joint ends of said first and second rod portions.

* * * * *

UNITED STATES PATENT AND TRADEMARK OFFICE
CERTIFICATE OF CORRECTION

PATENT NO. : 5,810,382

DATED : September 22, 1998

INVENTOR(S) : Onishi

It is certified that error appears in the above-identified patent and that said Letters Patent is hereby corrected as shown below:

On the title page, under "Primary Examiner"
after "Robert J." replace "Orerleitner" by --Oberleitner--;

Col. 1,     line 14, after "carriage" delete ", there is";
line 15, before "comprises" delete "an article of a form";
after "rods" delete "so"; after "that" delete "the";
line 16, before "are" delete "space between these push rods that";
line 24, before "while" replace "charged" by --changed--;

Col. 2,     line 21, after "situation" insert --,--;
line 22, after "portion" delete "and not that";
line 23, before "of" (second occurrence) delete "of the first portion";
after "portion" (second occurrence) replace "also pertain in the case" by --and not that of the first portion.--;
line 24, before "Similar" delete "in which."; after "matters" insert --also pertain in the case in which--;

Col. 3,     line 28, after "invention" insert --,--;

Col. 4,     line 63, after "shape" delete ",";

Col. 6,     line 9, after "which" replace "there" by --they--;
line 21, after "which" replace "there" by --they--;

UNITED STATES PATENT AND TRADEMARK OFFICE
CERTIFICATE OF CORRECTION

PATENT NO. : 5,810,382
DATED : September 22, 1998
INVENTOR(S) : Onishi

It is certified that error appears in the above-identified patent and that said Letters Patent is hereby corrected as shown below:

Col. 7, line 8, after "each" replace "others," by --other, --.

Signed and Sealed this

Fifteenth Day of December, 1998

Attest:

BRUCE LEHMAN

*Attesting Officer*     *Commissioner of Patents and Trademarks*